United States Patent
Hwang et al.

(10) Patent No.: US 6,731,510 B1
(45) Date of Patent: May 4, 2004

(54) RJ CONNECTOR FOR TRANSCEIVER MODULE

(75) Inventors: Jenq-Yih Hwang, Irvine, CA (US); Wayne Huang, Alhambra, CA (US); Eddy Wong, Irvine, CA (US); Hung Tieu, Alhambra, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/434,946

(22) Filed: May 8, 2003

(51) Int. Cl.[7] .................................................. H05K 5/00
(52) U.S. Cl. ........................ 361/754; 361/728; 361/801; 439/372; 439/157
(58) Field of Search ............................... 361/728, 725, 361/729, 732, 740, 747, 754, 759, 785, 798, 801; 439/607, 608, 609, 610, 638, 76.1, 157, 372

(56) References Cited

U.S. PATENT DOCUMENTS 6,430,053 B1 * 8/2002 Peterson et al. ............. 361/728
6,434,015 B1 * 8/2002 Hwang ........................ 361/754
6,439,918 B1 * 8/2002 Togami et al. .............. 439/372

* cited by examiner

Primary Examiner—David Martin
Assistant Examiner—Thanh S. Phan
(74) Attorney, Agent, or Firm—Wei Te Chung

(57) ABSTRACT

A small form factor pluggable transceiver module (100) comprises an RJ connector (1), a printed circuit board assembly (2), an engaging clamp (3), a cage (4), a frame (5) and a latching mechanism (6). The RJ connector attaches to the printed circuit board assembly. The engaging clamp engages both with the RJ connector and the printed circuit board assembly to strengthen the connection between the RJ connector and the printed circuit board assembly.

8 Claims, 7 Drawing Sheets

RJ CONNECTOR FOR TRANSCEIVER MODULE

BACKGROUND OF THE INVENTION

1. Field of the Invention

This invention relates generally to a small form factor pluggable (SFP) transceiver module and more particularly to a rein forced coupling design for connecting an RJ connector coupling to an SFP transceiver module. The application relates to a contemporaneously filed application titled "RJ CONNECTOR WITH ROBUST CONNECTOR ASSEMBLY FOR TRANSCEIVER MODULE" and having the same applicants and the same assigned with the instant invention.

2. Description of the Related Art

Transceivers are utilized to interconnect circuit cards of communication links and other electronic modules or assemblies. Various international and industry standards define the type of connectors used to connect computers to external communication devices, such as modems, network connectors, and other transceivers. A well-known type of transceiver module developed by an industry consortium and known as a Gigabit Connector Converter (GBIC) provides a connection between a computer and an Ethernet, Fiber Channel, or other data communication environment.

It is desirable to miniaturize transceivers in order to increase the port density at a network connection (at switch boxes, cabling patch panels, wiring closets, computer I/O, etc.). Small form-factor pluggable (SFP) transceiver modules were developed to meet this need, SFP transceivers are less than one half the size of a GBIC transceiver, and transmit data transmission at higher rates, allowing higher aggregated data throughput in a communication system.

Prior art SFP transceiver modules feature a plurality of electrical terminals accessible at a front end thereof; for making electrical contact with a mating plug connector. Such electrical terminals are soldered to a front edged of a printed circuit board received in the transceiver module. However, the soldered connection before the terminal and the circuit board is relatively weak. When a force excepted against the terminals is over a relatively low limit, they break from the circuit board and performance of the transceiver module is impaired.

Accordingly, there is a need for a SFP transceiver module having a reinforced structure that strengthens the connection between the connector at the front end of the SFP transceiver module and the rest of the transceiver module, thus protecting the conductive contacts at a front of the conductive contacts extending from the SFP transceiver module.

SUMMARY OF THE INVENTION

An object of the present invention is to provide an RJ connector for use in an SFP transceiver module, said RJ connector being mounted to a printed circuit board of the SFP transceiver module.

Another object of the present invention is to provide an SFP transceiver module having a reinforced structure, such that an RJ connector of the SFP transceiver module has a strong connection to the rest of the SFP transceiver module.

A small form factor pluggable transceiver module according to the present invention comprises an RJ connector, a printed circuit board assembly, an engaging clamp, a cage, a frame and a latching mechanism. The RJ connector attaches to the printed circuit board assembly. The engaging clamp engages with both the RJ connector and the printed circuit board assembly to strengthen the connection between the RJ connector and the printed circuit board assembly.

Other objects, advantages and novel features of the present invention will be drawn from the following detailed description of a preferred embodiment of the present invention, with attached drawings, in which:

DETAILED DESCRIPTION OF THE PREFERRED EMBODIMENT

Figure 1:
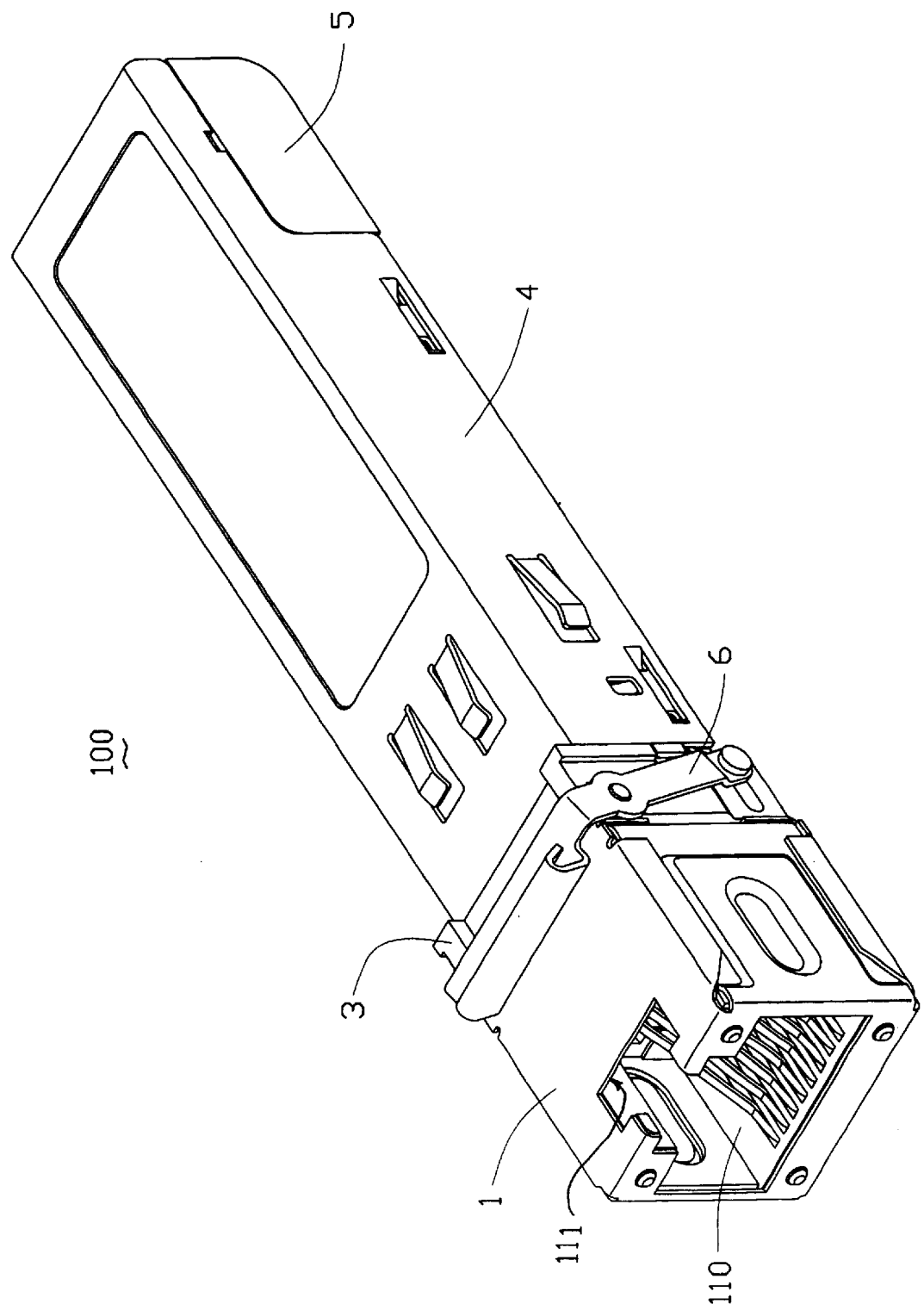
FIG. 1 is an assembled, perspective view of an SFP transceiver module of the present invention.
Figure 2:
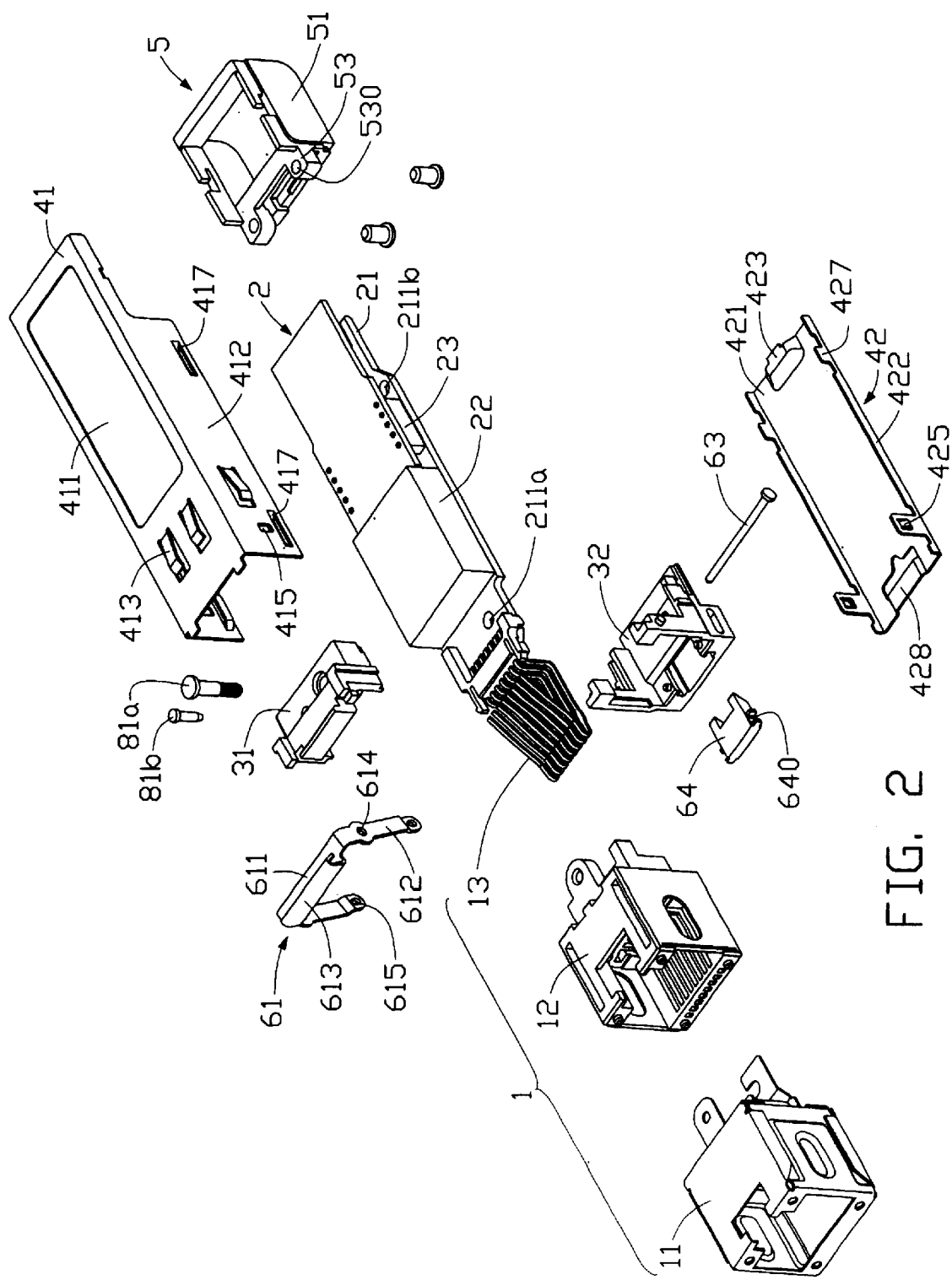
FIG. 2 is an exploded view of the SFP transceiver module of FIG. 1.

Referring to FIGS. 1 and 2, a small form factor pluggable (SFP) transceiver module 100 in accordance with the present invention comprises an RJ connector 1, a printed circuit board assembly (PCBA) 2, an engaging clamp 3, a cage 4, a frame 5 and a latching mechanism 6. The SFP transceiver module 100 is received in a shielding receptacle 9 (See FIG. 7).

Figure 3:
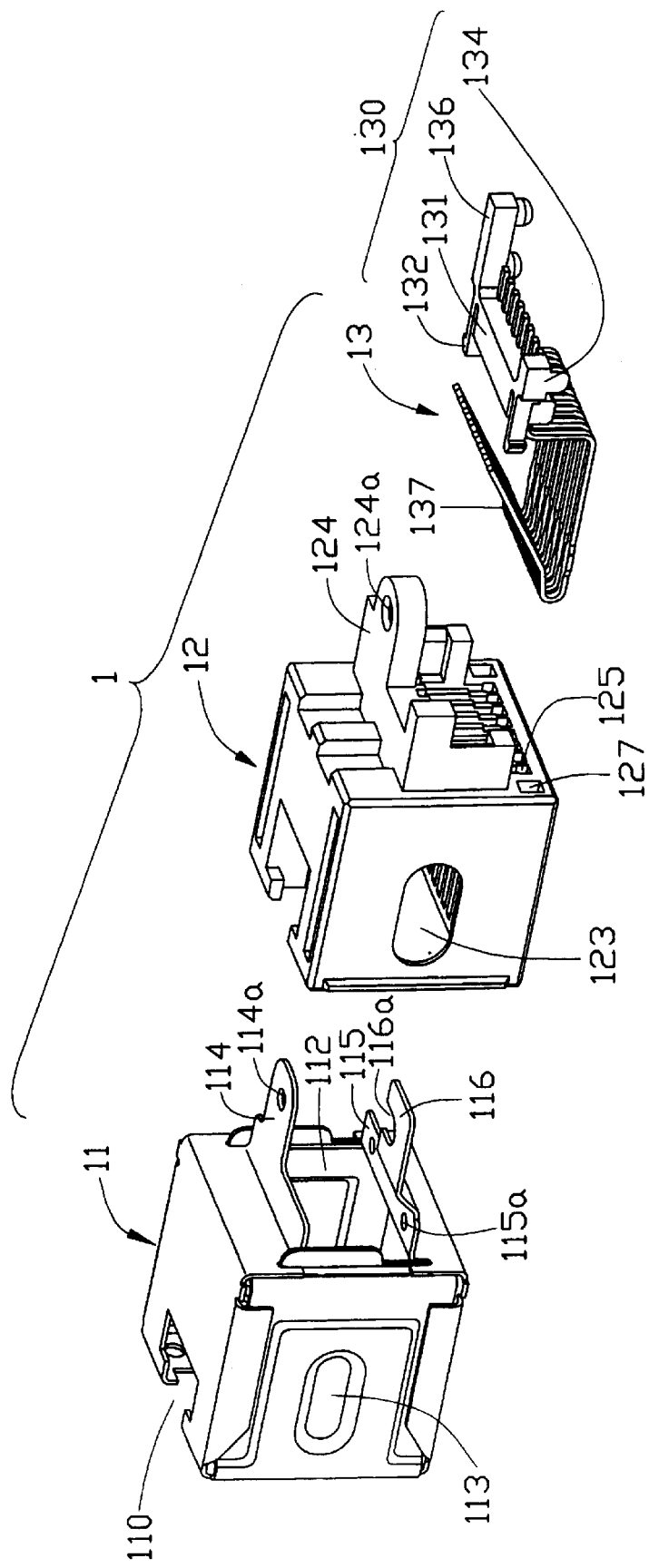
FIG. 3 is an exploded view of an RJ connector of the SFP transceiver module of FIG. 1.

Referring to FIG. 3, the RJ connector 1 comprises a shielding shell 11, a housing 12 and an RJ contact module 13. The shielding shell 11 is made from one piece of conductive material folded into a rectangular receptacle having a first and second openings 110, 112 and a latch opening 111. Two concave embossments 113 are respectively defined on two opposite walls of the shielding shell 11. A top sheet 114 projects rearwardly from a top edge of the second opening 112. A mounting hole 114a is defined through the top sheet 114. A bottom sheet 115 projects rearwardly from a bottom edge of the second opening 112 and defining a pair of mounting holes 115a therethrough. A protrusion 116 extends integrally from the bottom sheet 115 and defines a notch 116a therethrough.

The housing 12 is made of isolating material and is received within the shielding shell 11. A pair of slots 123 is defined at two sides (not labeled) of the housing 12 for engaging with the concave embossments 113 of the shielding shell 11. A flange 124 projects rearwardly from the housing 12 and corresponds to the top sheet 114 of the shielding shell 11, a screw hole 124a being defined therethrough and corresponding to and aligning the mounting hole 114a of the shielding shell 11. A plurality of parallel receiving channels 125 is defined through a bottom portion of a rear side (not labeled) of the housing 12. A pair of locking slots 127 is defined near the receiving channels 125.

The RJ contact module 13 includes a dielectric RJ module frame 130 and a plurality of conductive contacts 137. The RJ module frame 130 includes a rib 131, a pair of hooks 132, a short arm 134 and a long arm 136. The hooks 132 extend forwardly from two sides of the rib 131 for inserting into the locking slots 127 of the housing 12. The short arm 134 and a long arm 136 extend rearwardlly and form a plurality of positioning rods (not labeled) for being pressed into mounting holes (not shown) in the PCBA 2 to engage the PCBA 2 with the RJ contact modules 13. The contacts 137 are insert molded with the rib 131. A short portion (not labeled) of each contact 137 extends rearwardly from the rib 131 for soldering to the PCBA 2, and a bent long portion (not labeled) extends frontwardly for being received in the housing 12 to electrically contact terminals of a complementary connector (not shown) plugged into the first opening 110 of the RJ connector.

Referring back to FIG. 2, the PCBA 2 includes a main board 21, with a magnetic module 23 and a power module 22 mounted thereto. A mounting hole 211a is defined through a front end of the main board 21 and two mounting holes 211b are defined through a rearward end of the main board 21.

To assemble the RJ connector 1 to the PCBA 2, the housing 12 is received within the shielding shell 11 and the RJ contact module 13 is attached to the main board 21 on the PCBA 2. The plurality of positioning rods (not labeled) on the short and long arms 134, 136 of the frame 130 are pressed into corresponding mounting holes (not shown) in the main board 21. The short portions of the contacts 137 are soldered to the main board 21 and electrically connect with circuits of the PCBA 2. The long portions of the contacts 137 are then inserted into the channels 125 of the housing 12, and the hooks 132 of the RJ contact module 13 are inserted into locking slots 127 of the housing 12. Completion of assembly of the shielding shell 11 and housing 12 are mounted to the main board 21 of the PCBA 2, requires use of the engaging clamp 3.

Figure 4:
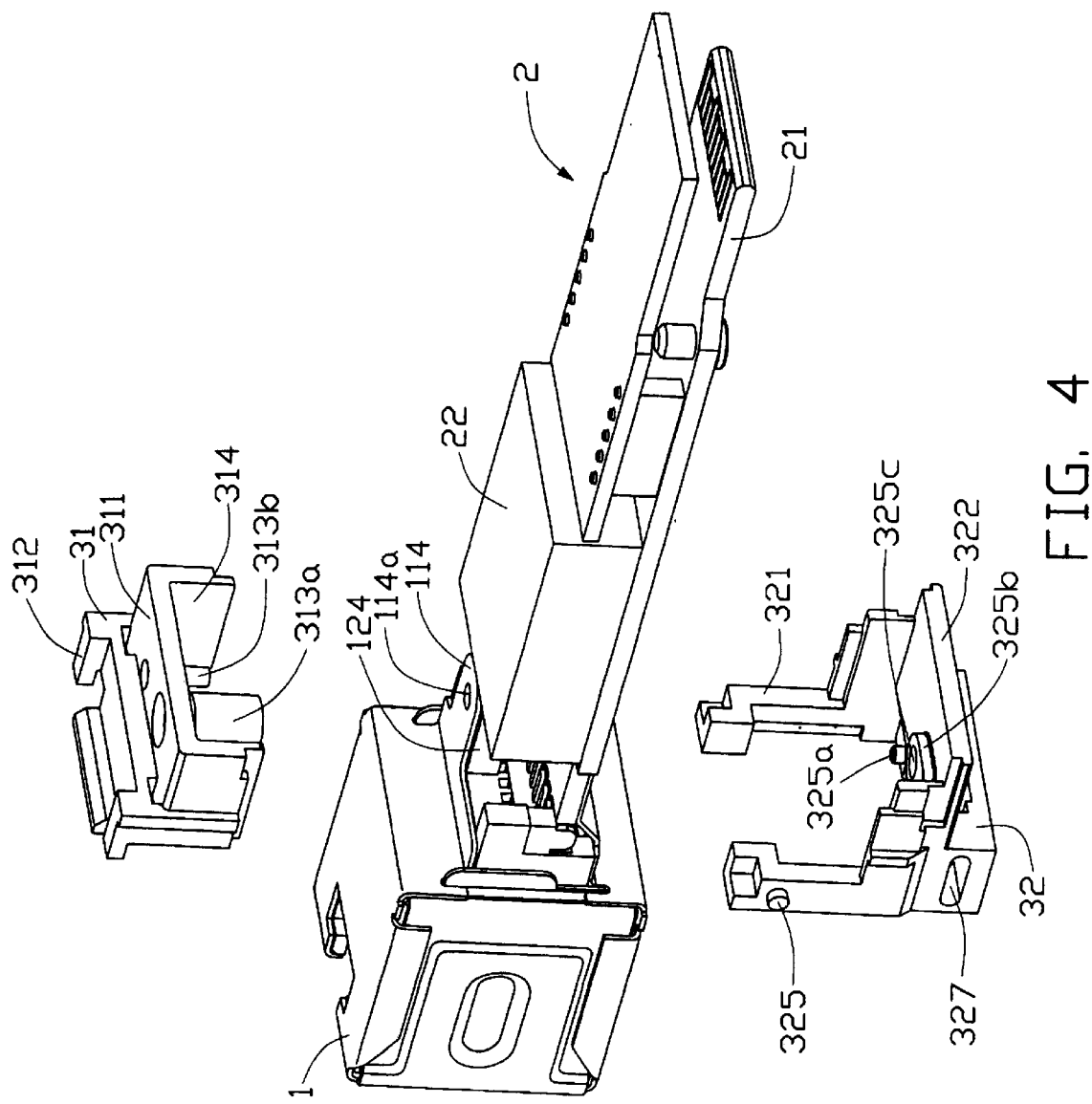
FIG. 4 is a perspective view of the RJ connector of FIG. 3 assembled to a printed circuit board assembly, and a top and base clamp prior to being assembled thereto of the SFP transceiver module of FIG. 1.

Referring also to FIG. 4, the engaging clamp 3 is die-cast and includes a top clamp 31 and a base clamp 32. The top clamp 31 includes a body 311 a pair of engaging portions 312 extending forwardly therefrom, a pair of side walls 314 extending downwardly from the body 311, and a screw rod 313a and a positioning rod 313b respectively extending from a bottom surface of the body 311. The base clamp 32 includes a pair of supporting arms 321 and a base 322. Each supporting arm 321 has an engaging face (not labeled) defining on a top end thereof for engaging with a corresponding engaging portion 312 of the top clamp 31. An axle 325 is formed on each supporting arm 321 adjacent to the top end thereof. A slot 327 is defined transversally through the body 322 and a passageway 329 (see FIG. 5) is defined longitudinally through the body 322 and in communication with the slot 327. A triangular wedge 328 (see FIG. 5) protrudes downwardly from a bottom surface of the base 322. Two mounting pins 325a are defined in the body 322 for engaging with the mounting holes 115a of the bottom sheet 115 of the shielding shell 11. A boss 325b is formed on the body 322, and defines a screw hole 325c therethrough, which aligns with the screw rod 313a of the top clamp 31, the mounting hole 211a of the main board 21, and the notch 116a of the bottom sheet 115 of the shielding shell 11.

To assemble the engaging clamp 3 to the assembled RJ connector 1 and PCBA 2, the base clamp 32 is fitted against a bottom of the assembled RJ connector 1 and PCBA 2 with the boss 325b of the base clamp 32 fitting into the notch 116a of the shielding shell 11. The mounting pins 325a also fit into the mounting holes 115a of the bottom sheet 115. The top clamp 31 is then fitted against engages with the base clamp 32, with the engaging portion 32 engaging with engaging faces (not labeled) of the supporting arms 321, and the screw pole 313a aligning with the mounting hole 211a of the PCBA 2 and the screw hole 325c in the boss 325b of the base clamp 32. The positioning rod 313b likewise inserts through the mounting hole 114a and the screw hole 124a of the RJ connector 1. A screw 81a (FIG. 2) screws through the screw rod 313a, the mounting hole 211a, the notch 116a of the protrusion 116 and the screw hole 325c in the boss 325b. A locking pin 81b likewise is forcedly pushed through the positioning rod 313b. The engaging clamp 3 thus reinforces the connection between the RJ connector 1 and the PCBA 2. The strength of the RJ connector 1 is thereby increased.

Figure 5:
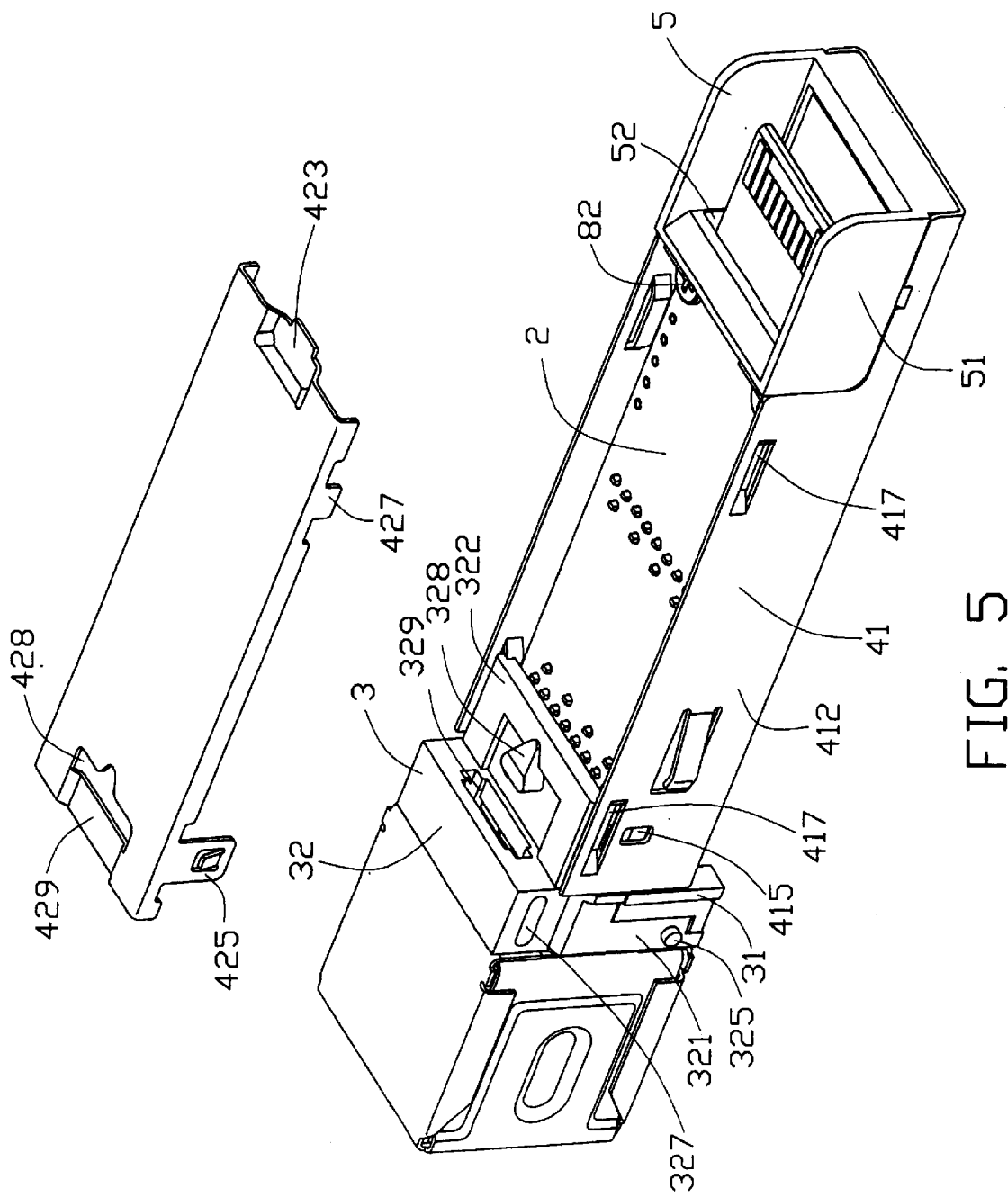
FIG. 5 is a reverse view of FIG. 1, wherein a bottom cage is not assembled thereto.

Referring to FIGS. 2 and 5, the cage 4 for receiving the PCBA 2 is made of conductive material, and includes a separate top and bottom cage 41, 42. The top cage 41 includes an elongate, rectangular top wall 411 and two side walls 412 extending downwardly therefrom. A length of the side wall 412 is shorter than the top wall 411. A plurality of grounding tabs 413 extends outwardly from a first end (not labeled) of the top wall 411 and two side walls 412. A cut-out 415 is defined at a front of each of the side walls 412 and a pair of receiving slits 417 is respectively defined at a front and a rear ends of each of the sidewalls 412.

The bottom cage 42, also made of a conductive material, includes an elongate, rectangular bottom wall 421 and a pair of short side walls 422 extending upwardly therefrom. A triangular opening 428 is defined through a front of the bottom cage 42 and a curved surface 429 is formed to a front of the opening 428. A groove 423 is formed at a rear end of the bottom cage 42 with a tab (not labeled) projecting rearwardlly therefrom. A pair of locking tabs 425 and a pair of short tabs 427 respectively extend vertically upwardly from the short side walls 422 to engage with the cut-outs 415 and the receiving slits 417 of the top cage 41.

The frame 5 for attaching to the top cage 41 is die-cast of a conductive material, has two side walls 51, an opening 52 and a pair of positioning blocks 53. Two screw holes 530 are respectively defined through the positioning blocks 53 for aligning with the mounting holes 211b of the main board 21 of the PCBA 2.

To assemble the cage 4 to the assembled PCBA 2, the frame 5 is attached to the rear end of the top cage 41 and the PCBA 2 is inserted into the top cage 41 from the front end thereof, with its rear end being received in the frame 5 from the opening 52 thereof. Two tabs (not labeled) on a front edge of the top wall 411 of the top cage 41 respectively engage with two slits (not labeled, see FIG. 4) in the top clamp 31. Two screws 82 are inserted into the mounting holes 211b of the main board 21 and the screw holes 530 of the frame 5 to fix the PCBA 2, the frame 5 and the top cage 41 together. The bottom cage 42 assembled to cover to a bottom of the top cage 41, the triangle wedge 328 of the base clamp 32 passes through the opening 428 of bottom cage 42, and the tab (not labeled) of the groove 423 is retained by the frame 5. The locking tabs 425 lockingly engage with the forward slits 417 and the cut-outs 415 of the top cage 41 and the short tabs 427 are received into the rearward slits 417. The top cage 41 and the bottom cage 42 are thus engaged together and receive the engaging clamp 3 and the PCBA 2 therein.

Figure 6:
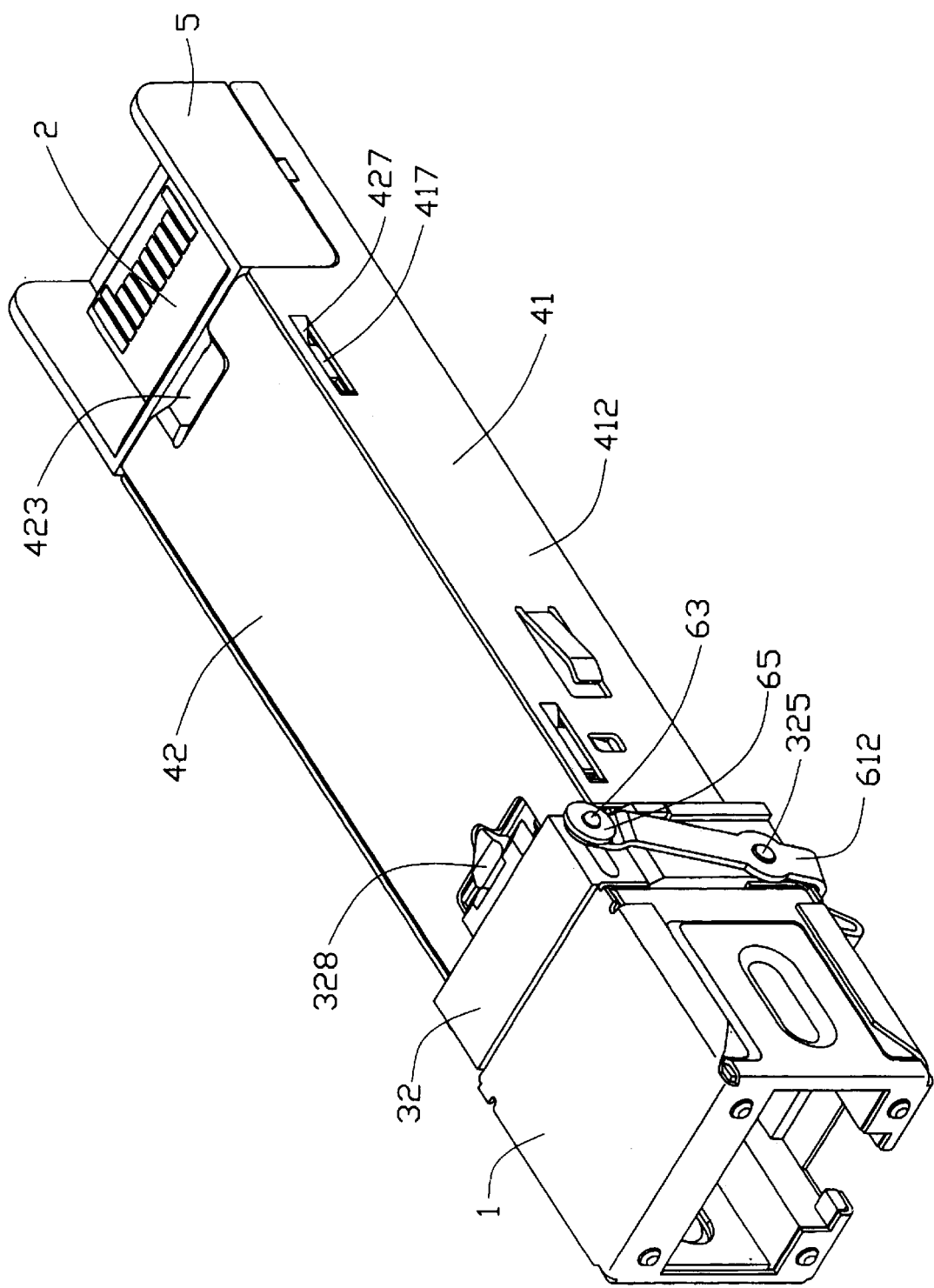
FIG. 6 is an assembled, perspective view of an SFP transceiver module from a bottom aspect.

Referring to FIGS. 2 and 6, the latching mechanism 6 includes an actuator 61, a linkage pin 63, an extraction tab 64 and an O-ring 65. The actuator 61 is shaped like a doorframe, and includes a doorhead 611 and two doorjambs 612. A handle 613 curves upwardly and rearwardlly from the doorhead 611. A pair of positioning holes 614 is defined through the doorjambs 612 for engaging with the axle 325 of the base clamp 32, and a pair of mounting holes 615 is defined through the bottom ends thereof for engaging with the linkage pin 63. The linkage pin 63 is a rod having a head (not labeled) on one end that is larger than the mounting hole 615 of the doorjamb 612. A through hole 640 is defined through the extraction tab 64 for receiving the linkage pin 63 therein.

To assemble the latching mechanism 6 to the engaging clamp 3, the extraction tab 64 is inserted into the passageway 329 of the base clamp 32 and the actuator 61 is attached to the base clamp 32 with the mounting holes 614 engaging with the axle 325. The linkage pin 63 passes through the mounting holes 615, the slots 413, 327, and the through hole 640 of the extraction tab 64. The O-ring 65 is then attached to an end of linkage pin 63 opposite the head to prevent the linkage pin 63 from moving out of engagement with the latching mechanism 6. The assembly of the SFP transceiver module 100 is thus finished.

In operation, pulling the handle 613 of the actuator 61' forwardly, causing the actuator 61 to rotate about the axles 325. The rotating movement drives the linkage pin 63 and extraction tab 64 and toward rearwardlly. The extraction tab 64 moves rearwardlly along the coved surface 429 and toward the axles 325, the triangle wedge 328 of the base clamp 32, driving against the lip 92 of the locking tab 90 on the shielding receptacle 9. As a result, the locking tab 90 is driven downwardly and the triangular wedge 328 is released from the triangular hole 91 and SFP transceiver module 100 from the shielding receptacle 9.

Figure 7:
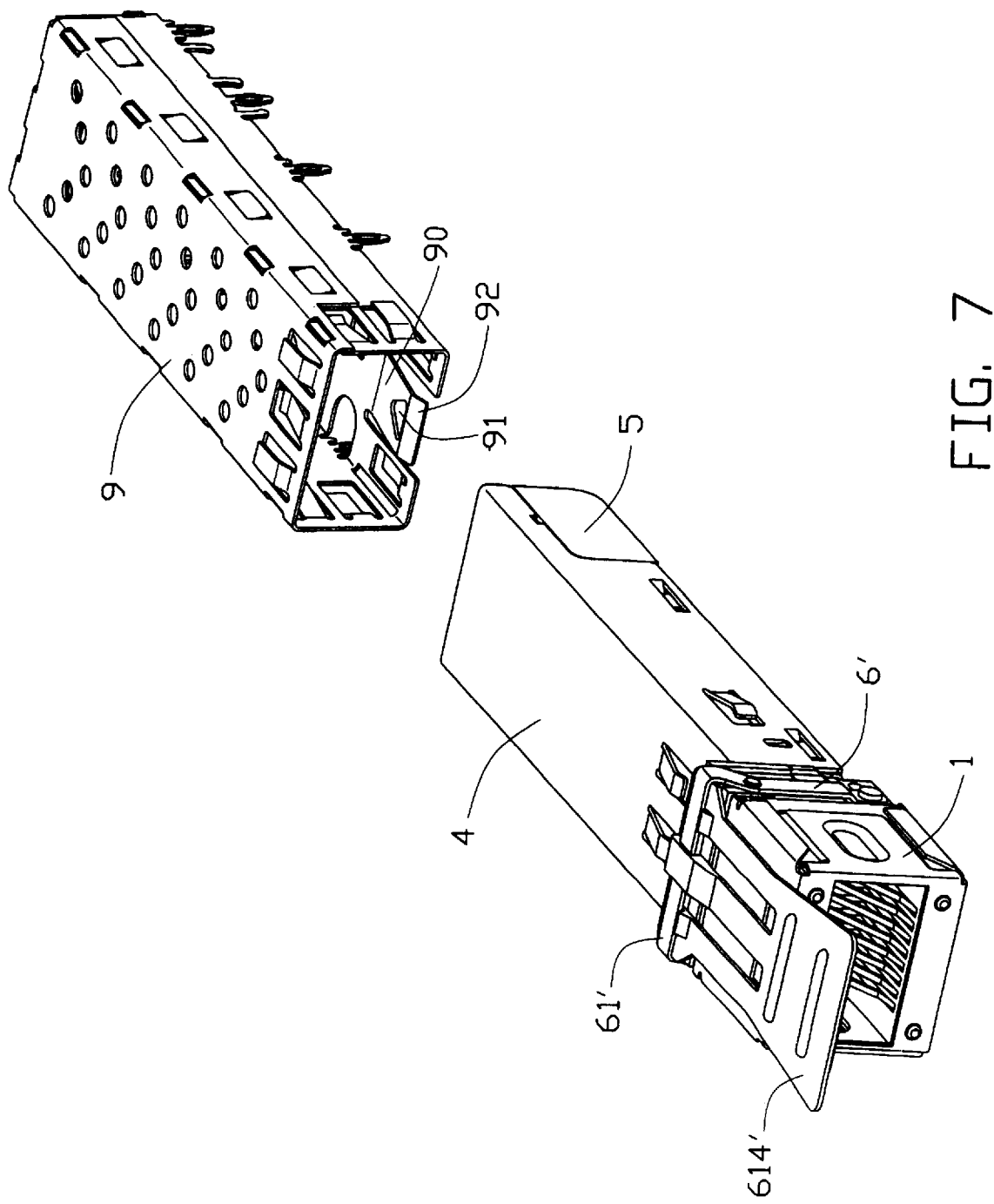
FIG. 7 is an assembled, perspective view of an SFP transceiver module of a second embodiment of the present invention, and a shielding receptacle adapting for receiving the SFP transceiver module therein.

Referring also to FIG. 7, a second embodiment of the latching mechanism 6' replaces the actuator 61 with an actuator 61' and a pull-tab 614' linked to the actuator 61'. In operation, the pull-tab 614' is pulled forwardly away from the front of the SFP transceiver module 100, pulling a top of the actuator 61' forwardly, causing the actuator 61' to rotate about the axles 325. This design makes the operation of the actuator 61' easy.

Although the present invention has been described with specific terms, it should be noted that the described embodiments are not necessarily exclusive, and that various changes and modifications may be made thereto without departing from the scope of the present invention as defined in the appended claims.

What is claimed is:

1. A small form factor pluggable transceiver module for being pluggable into an outer shielding receptacle, comprising:
   a printed circuit board;
   a metallic cage enclosing said printed circuit board;
   an RJ connector attachable located in front of said printed circuit board, said connector including an insulative housing enclosed in a metallic shell; and a clamp device generally located between the RJ connector and the printed circuit board in a front-to-back direction, said clamp device being equipped with an extraction tab moveable along said front-to-back direction and actuated to move by a pivotal actuator;
   wherein a handle of said pivotal actuator is located adjacent to a plane of said shell, and
   a latching opening is formed in said plane;
      wherein the engaging clamp helps secure the RJ connector and the printed circuit board together, thus more securely fixing the RJ connector to the printed circuited board assembly;
      wherein the RJ connector includes a housing, a conductive shielding shell and an RJ contact module; said housing receives the shielding shell therein and the shielding shell attaches to the printed circuit board assembly; and
      a latching mechanism attaches to the engaging clamp for disassembly the small form factor pluggable transceiver module from the shielding receptacle.

2. The small form factor pluggable transceiver module as described in claim 1, wherein the housing is made of insulating material, and includes a plurality of channels and a pair of slots therein.

3. The small form factor pluggable transceiver module as described in claim 2, wherein the RJ contact module includes a plurality of conductive contacts held in a frame, the frame including a pair of hooks, the contacts being received in the channels of the housing and the hooks being inserted into the slots of the housing for preventing the RJ contact module from being released from the housing.

4. The small form factor pluggable transceiver module as described in claim 1, wherein the conductive contacts of the RJ contact module are fixed to the printed circuit board by solder.

5. The small form factor pluggable transceiver module as described in claim 1, wherein the cage is made of conductive material, and receives the printed circuit board assembly and the engaging clamp therein.

6. The small form factor pluggable transceiver module as described in claim 1, further including a frame attached to a rear end of the cage and fixingly engaged with the printed circuit board assembly.

7. The small form factor pluggable transceiver module as described in claim 1, wherein the clamping engagement further includes a top clamp and a base clamp for respectively engaging with the printed circuit board assembly from a top and bottom thereof.

8. The small form factor pluggable transceiver module as described in claim 1, wherein a triangle extends from the engaging clamp for engaging with the shielding receptacle.

* * * * *